United States Patent [19]
Semenov et al.

[11] Patent Number: 5,925,154
[45] Date of Patent: Jul. 20, 1999

[54] CARBON BONDED ABRASIVE TOOLS AND METHOD FOR PRODUCING

[75] Inventors: Semen S. Semenov; Andrey A. Shkola, both of St. Petersburg, Russian Federation; John L. White, Chesapeake, Va.

[73] Assignee: Materials Specialties Scandinavia, Inc., Chesapeake, Va.

[21] Appl. No.: 08/907,821

[22] Filed: Aug. 14, 1997

[51] Int. Cl.⁶ ........................................ B24D 3/02
[52] U.S. Cl. .................. 51/295; 51/306; 51/307
[58] Field of Search ............................. 51/293, 295, 306, 51/307; 427/249, 255.1, 212; 264/3.4

[56] References Cited

U.S. PATENT DOCUMENTS

| | | | |
|---|---|---|---|
| 3,646,713 | 3/1972 | Marshall et al. | 51/309 |
| 3,852,078 | 12/1974 | Wakatsuki et al. | 51/307 |
| 4,491,457 | 1/1985 | Pope | 51/308 |
| 4,810,447 | 3/1989 | Csillag | 264/125 |
| 4,985,051 | 1/1991 | Ringwood | 51/309 |
| 5,152,810 | 10/1992 | Rue et al. | 51/309 |
| 5,266,236 | 11/1993 | Bovenkerk | 252/503 |
| 5,271,547 | 12/1993 | Carlson | 228/122.1 |
| 5,672,382 | 9/1997 | Lux | 427/213 |
| 5,738,698 | 4/1998 | Kapoor et al. | 51/309 |
| 5,759,216 | 6/1998 | Kanada et al. | 51/309 |

*Primary Examiner*—Deborah Jones
*Attorney, Agent, or Firm*—Thorpe, North & Western, L.L.P.

[57] ABSTRACT

A method of producing a carbon bonded abrasive tool by chemical vapor deposition of carbon, such as pyrolytic carbon, diamond, or a polymorphous form of diamond through a preshaped tool, the preshaped tool containing a mixture of abrasive particles, and also the carbon bonded abrasive tool produced by the method. The mixture of abrasive particles may include a mixture of a superabrasive powder and an abrasive powder filler. All or a portion of the filler has been impact processing by subjecting the filler to an uniform super-pressure exceeding one gigapascal to break up the filler into random size particles, some at the original mesh size interspersed with a continuum of smaller particles.

23 Claims, 3 Drawing Sheets

CARBON BONDED ABRASIVE TOOLS AND METHOD FOR PRODUCING

BACKGROUND OF THE INVENTION

1. Field of the Invention

This invention relates to abrasive tools for grinding, cutting, drilling, and other machining of hard materials. More particularly, this invention relates to carbon bonded abrasive tools and a process for bonding abrasives in a carbon bond.

2. State of the Art

Machinists use abrasive tools for grinding, cutting, drilling, and other machining of hard materials. Examples of such abrasive tools include grinding and cutting wheels and their elements, honing sticks, lapping tools, drills, reamers and others. Abrasive tools are used for both mechanical and electrical discharge machining (EDM).

Present abrasive tools are composed of super abrasive materials such as diamond powder or cubic boron nitride (CBN) powder held in a resin bond. Typical resin bonds include phenol formaldehyde and polyamide. Abrasive tools made of diamond powder are used to machine cemented carbides, semiconductors, ceramics and other hard fragile material. Abrasive tools made of CBN are used to machine nickel-based super alloys, hardened steel alloys, and other metal materials.

There is a continual need for improved abrasive tools suitable for higher rates of production under extremely rigorous work conditions such as cutting, slitting, plunge grinding, super finishing and/or rapid material removal. Operation under such conditions generates excessive heat which causes resin bond abrasive tools to deteriorate rapidly.

There are several reasons for this rapid deterioration of resin bond abrasive tools operating under severe conditions. First, resins have a higher thermal coefficient of linear expansion as compared to the thermal coefficient of linear expansion of abrasives such as diamond and CBN. Under extreme conditions, as the temperature of the tool increases, the expansion of the resin is greater than the expansion of the abrasive. As a result, the resin and the abrasives separate, forming micro cracks throughout the resin bond abrasive tool. This crack formation decreases the strength of the bonding resin and hence, the service life of the tool.

The heat problem is further aggravated by the inherent low thermal conductivity of the resins. As a result, the extremely high temperatures generated in the contact zone between the abrasive instrument and the work piece is not rapidly dissipated. A bonding material with a higher thermal conductivity than that of the resin would more effectively dissipate heat away from the contact zone into cooler areas of the tool, into other machinery, and into lubricants. Therefore, destructive temperatures could be better avoided.

Finally, the resin acts as an electrical insulator, making present resin based abrasive tools unsuitable for electrical discharge machining.

SUMMARY OF THE INVENTION

It is an object of the invention to provide a more effective and durable bonding process to increase the performance of superabrasive tools for grinding, cutting, drilling, and other machining operations.

It is also an object of the invention to provide an abrasive bond that remains intact under more severe conditions than possible with current abrasive tools.

It is a further object of the invention to provide a carbon bond for abrasive tools having a high thermal conductivity greater than the thermal conductivity of resin and vitreous bond abrasive tools currently used.

It is another object of the invention to provide abrasive tools that are resistant to acid, alkaline, and other chemical agents, and thus more suitable for use with advanced coolants and lubricants.

It is still another object of the invention to provide abrasive tools having superior storage life.

It is an additional object of the invention to provide an abrasive bond with a broad range of hardness for different applications.

It is a further object of the invention to provide abrasive tools which allow for increased material removal rates and service life.

It is also an object of the invention to provide an abrasive bond with high electrical conductivity, suitable for electrical discharge machining (EDM) or electrical discharge grinding (EDG).

It is also another object of the invention to provide an abrasive tool for EDM and EDG that allows simultaneous high material removal rates and finishing operations.

It is an additional further object of the invention to provide abrasive tools with reduced production costs and environmental impact.

It is also an additional further object of the invention to economically provide abrasive tools with complex geometries or very thin cross sections.

This invention includes a method of producing a carbon bonded abrasive tool from a mixture of abrasive particles by forming a preshaped tool and then saturating the preshaped tool with hydrocarbons and other carbon source gas that thermally decompose through the preshaped tool, leaving a chemically bonded carbon deposit on the individual abrasive particles. This process (called chemical vapor deposition) causes the deposit to become progressively thicker until the abrasive particles are bonded together in a strong bond of carbon. This invention also includes the carbon bonded abrasive tool produced by chemical vapor deposition. The carbon bond may be formed by pyrolytic carbon, diamond, diamond in various polymorphous forms, Pyrocarbon, and other forms of carbon and mixtures and combinations thereof.

In one important embodiment, the mixture of abrasive particles includes a mixture of a superabrasive powder and an abrasive powder filler in which all or a portion of the filler has been impact processed by subjecting the filler to an uniform super-pressure exceeding one gigapascal to break down the particles in the filler into random size particles, with some particles at the filler's original mesh size interspersed with a continuum of smaller particles. Impact processing the filler before the chemical vapor deposition produces carbon bonded abrasive tools of exceptional quality that outperform presently available abrasive tools.

BRIEF DESCRIPTION OF THE DRAWINGS

The above and other objects, features and advantages of the invention will become apparent from the following detailed description with the accompanying drawings.

DETAILED DESCRIPTION

Figure 1:
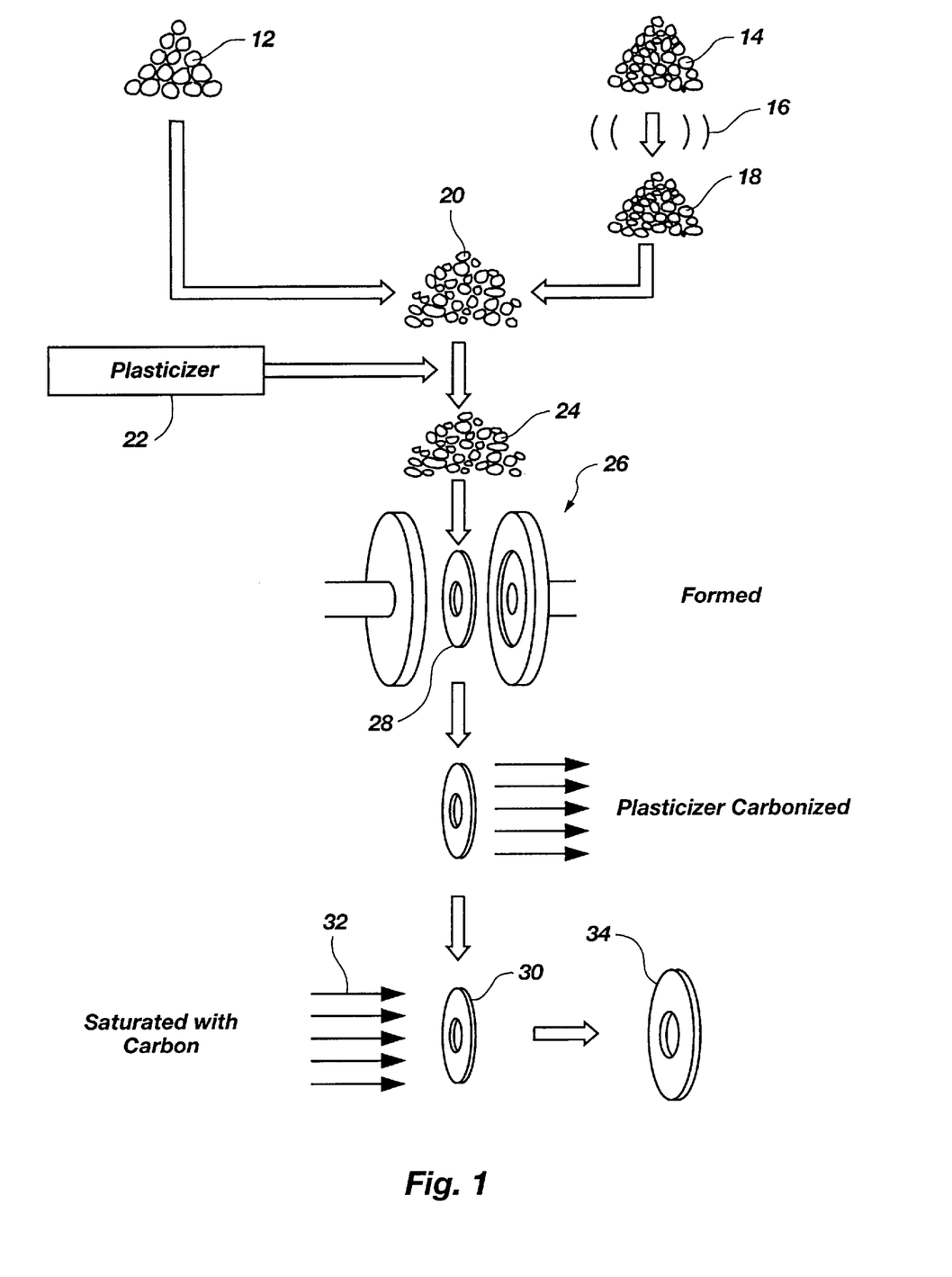
FIG. 1 shows the steps of a method for making a carbon bonded abrasive tool using a preferred embodiment of this invention.

FIG. 1 shows the steps of a preferred method for making a carbon bonded abrasive tool 34 from a superabrasive powder 12 such as diamond or cubic boron nitride (CBN) and a filler 14. The filler 14 may be composed of either a homogenous powder, a blend of powders of different compositions or a combination of powders and fibers. A superabrasive 12 of the desired mesh size is chosen. A filler 14, with the same, or preferably one size smaller mesh size than the superabrasive, is chosen. Some suitable fillers are listed in Table 1 below.

TABLE 1

Abrasive Fillers

| | | |
|---|---|---|
| Borides of Titanium | Silicide of Molybdenum | Oxides of Aluminum |
| Borides of Zirconium | Silicide of Boron | Oxides of Chromium |
| Borides of Aluminum | Silicide of Chromium | Oxides of Silicon |
| Other Borides | Other Silicides | Other Oxides |
| Nitrides of Silicon | Carbides of Boron | Spinel |
| Nitrides of Aluminum | Carbides of Silicon | |
| Nitrides of Titanium | Carbides of Titanium | Garnet |
| Nitrides of Tantalum | Carbides of Tungsten | |
| Other Nitrides | Carbides of Chromium | Agat |
| | Other Carbides | |
| | | Other Complex Oxides |

Mixed compositions based on the above fillers, such as

| | | |
|---|---|---|
| Carbonitrides | Carbooxides | Oxinitrides |
| Carboborides | Carbosilicides | Oxicarbides |
| | Boronitrides | |

Super abrasives such as diamond and CBN
Mixed compositions based on the superabrasives The powder filler 14 is impact processed 16 to produce a mixed size filler 18. Impact processing is the sudden subjecting of the filler to uniform pressure exceeding one gigapascal (GPa), or about 10,000 atmospheres where 1 atm=$1.013 \times 10^5$ Pa. The impact processing 16 breaks up the filler material 14 into random particles and in the process disperses these uniformly through out the resultant mass. This process 16 acts upon the crystals of the unprocessed filler 14 individually. Thus, some crystals remain unaffected while, to varying degrees, others are totally disintegrated. This results in a processed powder in which some material of the original size is left virtually undisturbed and evenly distributed within a continuum of material of decreasingly smaller particles which extends downward into a size range of a few microns, or less.

Figure 3:
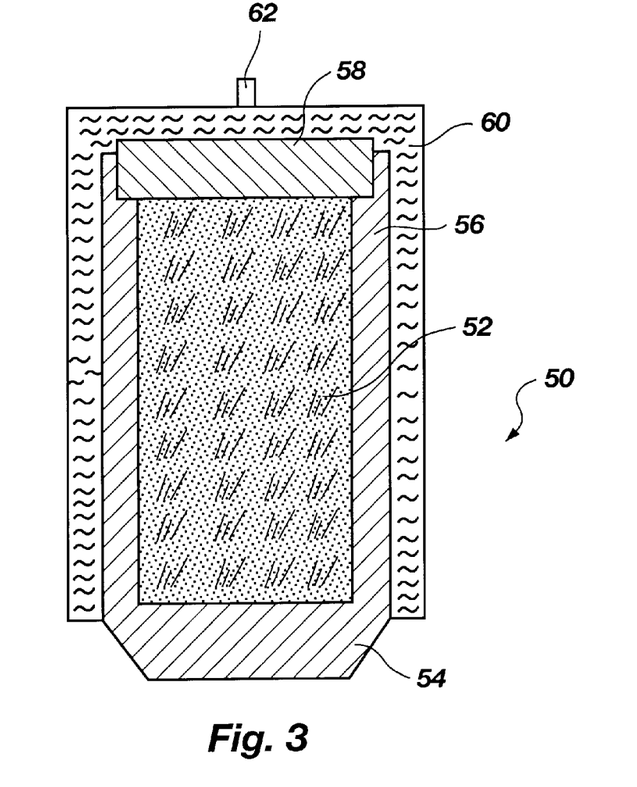
FIG. 3 is a an elevational cross sectional view of a device for explosive processing filler powder.
Figure 4:
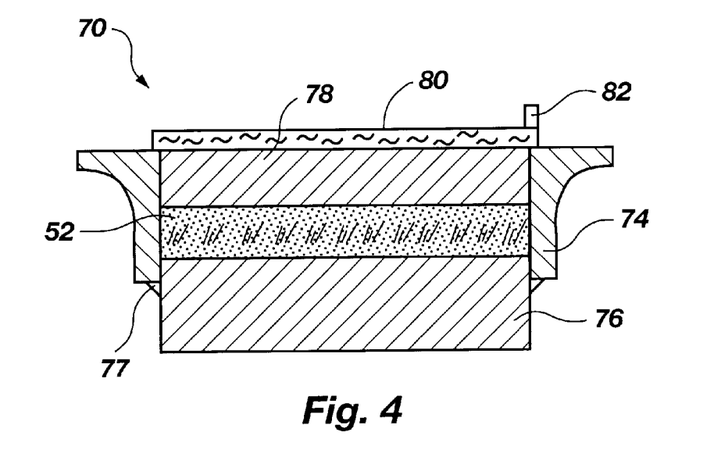
FIG. 4 is a an elevational cross sectional view of a device for explosive processing filler powder.

Two devices 50 and 70 for explosive processing of filler powder are shown in FIGS. 3 and 4 respectfully. Referring to FIG. 3, the filler powder 52 is compacted into an enclosed capsule 54. The capsule 54 has a cylindrical steel body 56 and a cover 58. The cover 58 may be welded onto the body 56 or rolled in such a way as to securely seal the cover 58. The capsule 54 is surrounded by a calculated quantity of explosives 60. A detonator 62 is used to detonate the explosives 60. Alternatively, referring to FIG. 4, a ring 74 is placed around a support plate 76 and held in place by a stop 77. The filler powder 52 is compacted into the ring 74 and covered with a ram 78. A calculated quantity of explosives 80 is placed on the ram 78. A detonator 82 is used to detonate the explosives 80. Plastic explosives may be used with an electrical detonator.

Alternatively, the mixed size filler 18 may be created by mixing the original filler material with incrementally increasing volumes of decreasingly smaller filler particles. However, the alternative method is considerably less effective than impact processing in producing a filler with an ideal packing density for use in this process.

As illustrated in FIG. 1, the mixed size filler 18 is mixed with the superabrasive 12 to form an abrasive mixture 20. A plasticizer 22, such as phenol-formaldehyde resin in an alcohol solution, is added to the abrasive mixture 20 to form a moldable plasticized matrix 24 of superabrasive and mixed size filler. Alternatively, the plasticizer may be clay, kaolin, montmorillonite, or any cementitious material. In addition, other organic or metal compounds in a solvent may be used as the plasticizer.

The plasticizer matrix 24 is pressed in a mold 26 at a relatively low pressure of 70 Megapascals to form a plasticized green form or a net sized green form 28. This green form 28 is extremely fragile at this time. Alternatively, the green form 28 can be manufactured by any method of ceramic technology including pressing, hot "Shliker" forming, injection molding or hydrostatic pressing. In many of these methods, the substrate of the tool can be formed simultaneously with the abrasive layer, with the use of inexpensive powders such as glass, aluminum oxide, or natural silicates. It is also possible to manufacture the green form 28 in such a manner so as to produce an abrasive subassembly to be later joined to the finished tool, which may be produced by any other manufacturing technology, by any mechanical means.

At this point, no carbon bonding in the fabrication of the abrasive tool has taken place and the shape of the green form 28 is held by the plasticizer 22. The plasticizer 22 is then carbonized by heat treatment leaving a porous net sized green form or porous preshaped tool 30 which is composed of only the abrasive mixture 20 and the carbonized plasticizer. The net sized green form 30 is extremely porous and fragile.

The carbon bond is accomplished by volumetric deposition of carbons resulting from the infusion of gaseous hydrocarbons and other volatile carbon compounds into the porous green form 30. This process is called chemical vapor deposition or CVD. Chemical vapor deposition causes the growth of a thin solid carbon film on the individual superabrasive and abrasive filler particles in the interior of the tool 34. This thin carbon film grows volumetrically, joins with the carbon forming on adjacent particles and therefore bonds the particles together.

Figure 2A:
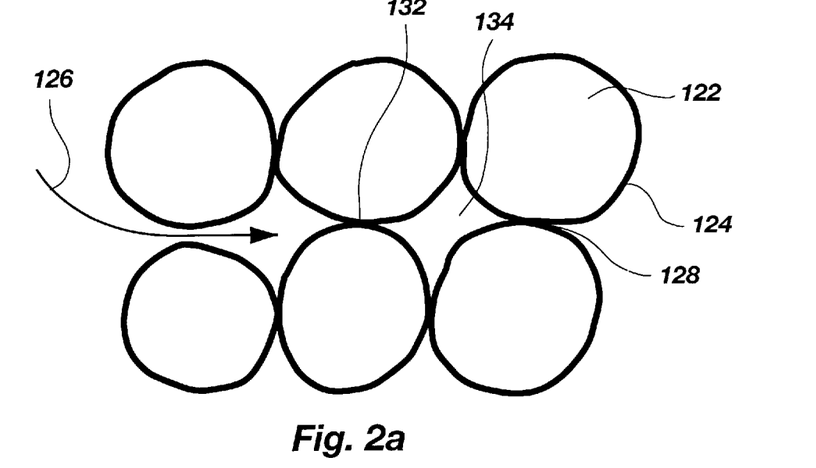
FIG. 2a is a microscopic view showing carbon bonding of abrasive particles with uniform diameter grain size.

The porous green form 30 is saturated with the carbons. FIG. 2a is a microscopic view showing the carbon bonding of abrasive particles 122 with uniform diameter grain size. Hydrocarbons 126 permeate the abrasive particles 122, depositing carbon 124 on the surface of each abrasive particle 122. Where abrasive particles touch 128, the carbon deposit 124 binds the surfaces of the particles 122 together.

The carbon 124 is deposited at a fairly uniform rate throughout the tool 34. However, as shown in FIG. 2a, narrow gaps 132 will quickly fill up, sealing off unbonded spaces 134. Thus, the gas is sealed off from the unbonded spaces 134 so that no further carbon 124 can be deposited. These spaces 134 form weak spots in the tool 34 where no bond holds the abrasive particles 122 together, greatly reducing the durability and strength of the finished tool.

Figure 2B:
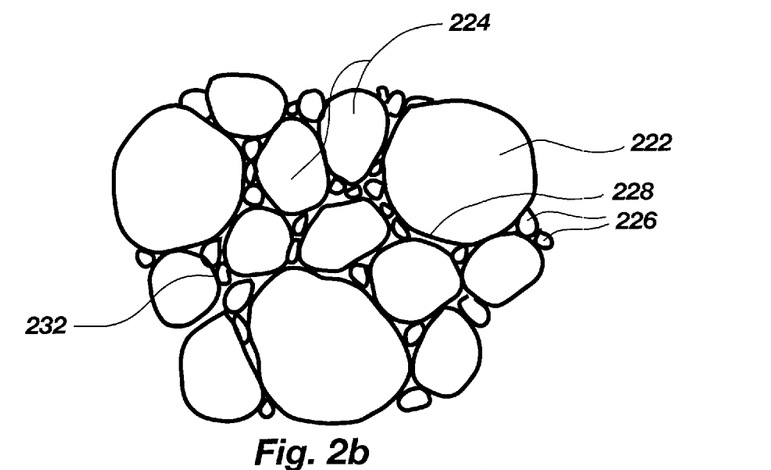
FIG. 2b is a microscopic view showing carbon bonding of abrasive particles with different diameter grain sizes, each grain size being uniformly distributed.

Therefore, the best bonding takes place when the spaces between the abrasive particles have an approximately uniform minimal size throughout the porous net sized green form 30. As shown in FIG. 2b, this happens when larger abrasive particles 222 are completely surrounded by increasingly smaller abrasive particles 224 and 226. FIG. 2b is a microscopic view showing carbon bonding of abrasive particles 224 and 226 with a continuum of different diameter grain sizes, the sizes being uniformly distributed. The spaces 232 between the abrasive particles 222, 224 and 226 are both fairly uniform and comparatively minimal in size. The carbon deposits form bonds 228 between the abrasive particles with little or no gaps in the bond.

Impact processing 16, described above, produces the ideal mixture of abrasive particles shown in FIG. 2b. As individual abrasive particles crumble under the pressure of the impact processing, small particles 224 remain surrounded by even smaller particles 226, the rubble broken off from the original particles. This mix is uniform and already compacted. Since not all particles of filler are broken down by impact processing, the initial size of the filler should not exceed the size of the superabrasive so as to avoid having larger filler particles than superabrasive particles.

Figure 2C:
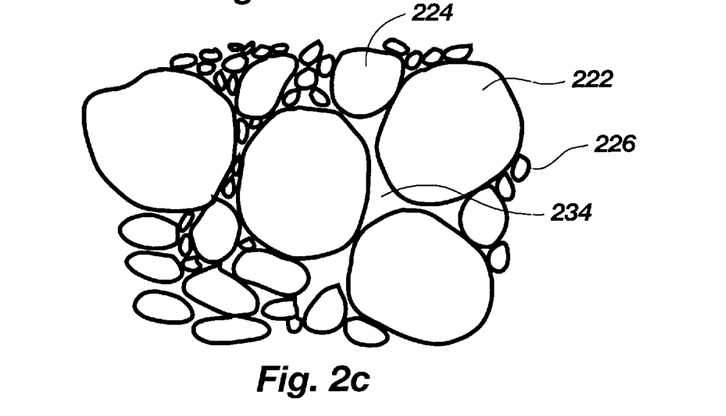
FIG. 2c is a microscopic view showing carbon bonding of abrasive particles with different diameter grain sizes, each size not uniformly distributed.

Alternately, as noted above, progressively smaller grains of filler can be mixed to produce a mixed size filler 18. This method is less effective as the abrasive particle sizes are less uniformly distributed and mixed than when produced by impact processing 16. FIG. 2c is a microscopic view showing carbon bonding of abrasive particles with different diameter grain sizes. However, each grain size is not uniformly distributed. The carbon deposit seals off gaps 234 where adjacent particles remain unbonded, creating weak spots that greatly reduce the service life of the tool.

Preferably, the carbon bond formed by the chemical vapor deposition is a pyrolytic carbon bond. Chemical vapor deposition of carbon requires thermal cracking of hydrocarbons. Cracking is the process of breaking down complex hydrocarbons into simpler hydrocarbons, hydrogen, carbon and other products. Pyrolysis is chemical decomposition of a compound by the action of heat.

Thermal cracking of hydrocarbons results in the formation of either carbon black or pyrolytic carbon depending on pyrolysis conditions. There are two types of pyrolytic carbon, low temperature pyrolytic carbon, formed at conditionally 670 K to 1370 K, and high temperature pyrolytic carbon, formed at conditionally 1370 K to 2460 K. Low temperature and high temperature pyrolytic carbon have different structures and properties. However, both low temperature and high temperature pyrolytic carbon condense to form practically a two dimensional layer on a heated surface. The pyrolytic carbon layer is nearly a geometric image of the heated surface.

The porous net sized green form or porous preshaped tool 30 is saturated with carbon source gas 32 to produce the pyrolytic carbon bonded abrasive tool 34. This can be done by placing the preshaped tool 30 in a reaction vessel at a temperature of optimally 1170 K to 1200 K through which the carbon source gas 32 is continuously introduced at a relatively low gas pressure. Alternatively, the carbon source gas may be introduced in a pulse mode, or alternating between a pressure and a vacuum. The weight of the tool 34 will increase as the carbon source gas 32 decomposes and the tool 34 is saturated with pyrocarbon. The saturation is complete when the tool 34 ceases to increase in weight. The reaction vessel may be of a type commonly used in the industry for CVD.

Best results occur when the carbon source gas 32 is introduced at a minimum gas pressure and temperature, or at the optimal condition when only pyrolytic carbon will be deposited. The carbon source gas 32 should be diluted by either nitrogen or inert gas and introduced at a pressure not to exceed 1000 Pascals, or introduced in a pulse mode (alternating vacuum—pressure). In any case, the temperature should not exceed 1770 K. Higher temperatures can cause diamond crystals to break down into graphite. The carbon source gas 32 can also be mixed with hydrogen gas to further reduce the rate of condensation and increase the rate of infiltration, allowing it to more completely and rapidly permeate through the porous net sized green form 30.

Alternatively, the carbon bond may be formed by chemical vapor deposition depositing solid carbons in the form of diamond or amorphous diamond. Methods for obtaining the chemical vapor deposition of diamond or amorphous diamond films include microwave plasma chemical vapor deposition (MWPCVD) and hot filament chemical vapor deposition (HFCVD). The hot filament process involves thermal activation of the carbon source gas. The microwave plasma process involves plasma activation of the carbon source gas. The preshaped tool 30 may be placed in a hot filament reactor or a microwave plasma reactor to obtain the diamond or diamond film in some amorphous or polymorphous state.

Carbon bonded abrasive tools, using impact processed filler, are superior to other abrasive tools for grinding, cutting, drilling, and other machining of hard materials. Unlike resin bond abrasive tools, carbon bonded abrasive tools are suitable for extremely rigorous work, such as cutting, plunge grinding or rapid material removal. Grinding, cutting, drilling, and other machining of hard materials generates heat, typically creating temperatures of 770 K through 870 K at the point where the tools contacts the work piece. During more difficult operations, the temperature can reach 1230 K to 1270 K on the tool's contact surface. Even with a surface temperature of only 770 K through 870 K, the temperature can exceed 620 K at the depth where the abrasive grains are fixed to the bonding material.

Carbon bonded abrasive tools better resist the high heat and the high stress of machining than do resin bond abrasive tools. Table 2 below compares the physical-mechanical properties of a carbon bond, in this embodiment a pyrolytic carbon bond, to the two most common resin bonds used for resin bond abrasive tools, phenol formaldehyde and polyamide.

TABLE 2

Comparison of the Pyrolytic Carbon Bond to Present Resins.

|  | Phenol formaldehyde | Polyamide | Pyrolytic Carbon Bond |
|---|---|---|---|
| Density | 1.40 G/cm$^3$ | 1.45 G/cm$^3$ | 2.10 G/cm$^3$ |
| Thermal Coefficient of linear expansion | (44–75) × 10$^{-6}$ K$^{-1}$ | (54–90) × 10$^{-6}$ K$^{-1}$ | (6.2–8.5) × 10$^{-6}$ K$^{-1}$ |
| Thermal Conductivity | 0.20 W/m$^2$ · K | 1.40 W/m$^2$ · K | 37.5 W/m$^2$ · K |
| Bending Strength | 40.0 MPa | 54.0 MPa | 120.0 MPa |
| Young's Modulus | 2.3 GPa | 1.3 GPa | 14.0 GPa |
| Thermal Stability at temperature | 460 K–490 K | 490 K–530 K | 770 K–870 K |

Phenol formaldehyde has a thermal coefficient of linear expansion thirty to fifty times larger than diamond's thermal coefficient of linear expansion of $1.4 \times 10^{-6}$ K$^{-1}$ and nine to sixteen times larger than CBN's thermal coefficient of linear expansion of $4.7 \times 10^{-6}$ K$^{-1}$. Polyamide has a thermal coefficient of linear expansion forty to sixty times larger than diamond's thermal coefficient of linear expansion and eleven to nineteen times larger than CBN's thermal coefficient of linear expansion. In comparison, the carbon bond has a much smaller thermal coefficient of linear expansion, only four to six times diamond's and only 1.3 to 1.8 times CBN's.

Therefore, as the resins heat up, they expand much more rapidly than diamond or CBN abrasive particles, causing the resin in the abrasive particles to separate. This separation forms micro cracks throughout the abrasive tool, quickly decreasing it's service life. In contrast, because of its low thermal coefficient of linear expansion, carbon bonds expand less rapidly, with less separation and fewer micro cracks than resin.

The heat problem in resin bond abrasive tools are further aggravated by the low thermal conductivity of the resins. Phenol formaldehyde has a thermal conductivity of only 0.20 $W/m^2.K$ and polyamide has a thermal conductivity of only 1.40 $W/m^2.K$, compared to the carbon bond's thermal conductivity of 35 to 45 $W/m^2.K$. As a result, heat generated in the resin bonded abrasive tool stays at the contact point while heat generated in the carbon bonded abrasive tool rapidly dissipates away from the contact point into the interior of the tool, into other machinery, and into lubricants and coolants, keeping the contact point relatively cool.

The bending strength of the carbon bond is 120 MPa, three times stronger than the bending strength of phenol formaldehyde and over twice as strong as polyamide. Bending strength is related to the maximum effective grinding rate of the abrasive tool and carbon bonded abrasive tools are shown to have higher material removal rates than resin bond abrasive tools.

Closely related to bending strength is Young's modulus. Young's modulus is the ratio of the stress to strain or the elastic modulus of a given material. The Young's modulus of the carbon bond is five times higher than phenol formaldehyde and twelve times higher than polyamide.

The thermal stability of the pyrolytic carbon bond in air is in the range of 770 K to 870 K. This is considerably higher than phenol-formaldehyde of 460 K to 490 K and polyamide of 490 K to 530 K. Thus, the carbon bond is more stable than the resin bonds.

There are other advantages of carbon bonded abrasive tools over the resin bond abrasive tools. Carbon bonded abrasive tools are harder than resin bond tools. Therefore, the carbon bonded abrasive tool produces a higher quality finished surface and better dimensional stability on a work-piece than other bonded abrasive tools. This is especially important for fine, precise finishing and automated accurate grinding.

The carbon bond is extremely resistant to acids and alkalines, and resists most chemical agents found in a machining environment. Therefore, carbon bonded abrasive tools work with advanced coolants and lubricants that react adversely with other bonded abrasive tools.

Because carbon bonds are less chemically reactive than other bonding material, the carbon bonded abrasive tool also has an increased storage life. The carbon bonded abrasive tool has an indefinite storage life compared to resin bond abrasive tools that begin to deteriorate within three months after being manufactured.

The bond in carbon bonded abrasive tools can be adjusted during manufacture to have varying degrees of hardness. The hardness of the carbon bond can range from HRA 10 to HRA 75 using a Rockwell standard, measured with a diamond cone with a tip angle of 120° and a pressure of 600 Newtons. Thus, a machinist can select the carbon bond's hardness for the specific application.

In addition, additives may be included in the filler to vary the performance of the abrasive tool. For example, to reduce the coefficient of friction of the abrasive tool's contact point on the work-piece, the filler can contain up to 30% solid additives with lubricating properties. Such lubricating additives include hexagonal boron nitride, graphite, fluoride, sulphide, selenide and others. To increase the mechanical strength of the abrasive tool, the filler can contain up to 68% fibers or whiskers of silicon carbide, carbon, boron, aluminum oxide, silicon oxide, silicon nitride, glass, basalt and others. Furthermore, the particles of the superabrasive powder may be metal, glass, or ceramic coated.

The carbon in carbon bonded abrasive tools, especially if doped with boron, is a good electrical conductor. A carbon bond can be doped with boron, nitrides or carbides. In contrast, the resin in resin bond abrasive tool is an electrical insulator. Therefore, considering the excellent heat tolerance and dissipation characteristics, carbon bonded abrasive tools are ideal for electrical discharge machining.

Carbon bonded abrasive tools are suitable for simultaneous electrical and mechanical machining to produce superior surface finishes on a work-piece.

The following examples illustrate applications of the principles of this invention.

EXAMPLE 1

Three thin cutting wheels were manufactured with the an outer diameter of 4.6 inches, an inside diameter of 3.5 inches, and a thickness of 0.032 inches. These wheels were designed to cut cemented tungsten carbide containing a significant percent cobalt. Such an application is one of the most difficult working conditions for a cutting wheel. The wheels had the following mix:

Wheel One

50% Superabrasive: synthetic diamond powder, type CDA, with grain size 230/270 mesh.

50% Filler: white fused aluminum oxide (electrocorundum) with grain size 5/3 microns.

Wheel Two

50% Superabrasive: synthetic diamond powder, type CDA, with grain size 230/270 mesh.

25% Filler: white fused aluminum oxide with grain size 5/3 microns.

25% Filler: synthetic diamond powder, type CDA, with grain size 230/270 mesh, impact processed at 20 GPa.

Wheel Three

40% Superabrasive: synthetic diamond powder, type MDA, with grain size 200/230 mesh.

20% Filler: CBN powder with grain size 3/0 microns.

40% Filler: synthetic diamond powder, type CDA, with grain size 230/270 mesh, impact processed at 20 GPa.

The superabrasive and fillers were mixed in a ball mill. A plasticizer, consisting of phenol formaldehyde resin in an alcohol solution, was added. The plasticizer mixture was shaped into cutting wheels at 70 MPa. The plasticizer was carbonized and the preshaped wheels were placed in a reaction vessel at a temperature of optimally 1170 K to 1200 K for the chemical vapor deposition of carbon, such as pyrolytic carbon. The chemical vapor deposition continued until the wheels stopped increasing in weight.

An experienced machinist used the three carbon bonded cutting wheels and a resin bond wheel manufactured in the United States to slit a Russian Standard Cemented Tungsten Carbide, BK-15 alloy, containing 15% cobalt, with a Rockwell hardness of 86 and a density of 14 $gm/cm^3$. The machinist had a U.S. manufactured water cooled saw with a rotational speed of about 1250 RPM. The machinist applied the same normal hand pressure he used for cutting other tungsten carbon materials. Experienced observers watched to determine the speed or freeness of the cut. After each wheel made a cut, the volume of the material removed from the work-piece and the volume of the material removed from the cutting wheel was measured and recorded. The results are shown in Table 3 below.

was inferior to the resin wheel, it was not tested on the sintered diamond PDC element. Wheel two's G ratio was 0.0115 and the relative ratio was 2.5. Wheel three's G ratio was 0.0057 and the relative ratio was 1.3.

TABLE 3

Results of Cemented Tungsten Carbide Test

| Wheel | Diameter[1] | Thick[1] | Wheel Volume Removed | Work-piece Volume Removed | G Ratio[2] | Relative Ratio[3] |
|---|---|---|---|---|---|---|
| Resin Bond | 5.992 | 0.035 | $6.589 \times 10^{-4}$ | 0.1073 | 163 | 1.0 |
| Wheel One | 4.590 | 0.031 | $13.411 \times 10^{-4}$ | 0.165 | 123 | 0.75 |
| Wheel Two | 4.565 | 0.035 | $<2.0 \times 10^{-4}$ | >0.15 | >750 | >4.6 |
| Wheel Three | 4.592 | 0.028 | $<2.0 \times 10^{-4}$ | >0.15 | >750 | >4.6 |

Note 1
All dimensions in inches.
Note 2
G ratio is equal to the wheel volume removed divided by the work-piece volume removed.
Note 3
Relative ratio is equal to the G ratio for the wheel divided by the G ratio for the resin wheel.

The observers evaluated the resin wheel cutting speed as "free cutting." The G ratio was 163, that is 163 volumes of work-piece were remove for every one volume of cutting wheel lost. As described in note 3, the relative ratio of the resin wheel was 1.

The observers evaluated wheel one's cutting speed as "medium cutting." The G ratio was only 123 and the relative ratio was 0.75. Wheel one was inferior to the resin wheel.

The observers evaluated wheel two's cutting speed as "really free cutting." The G ratio was at least 750 and the relative ratio was greater than 4.6. Wheel two was superior to the resin wheel.

The observers evaluated wheel three's cutting speed as "free cutting." The G ratio was at least 750 and the relative ratio was greater than 4.6. Wheel three was also superior to the resin wheel.

The resin wheel and cutting wheels two and three were subjected to a more rigorous test. These wheels were used to cut a United State Synthetics Corporation Sintered Diamond PDC Element. This was done merely for test purposes as it is uneconomical to slit diamond with such a wheel. The same experienced operator performed the test under the same conditions as described above. The results are shown in Table 4.

Example 1 demonstrated that carbon bonded cutting wheels made with impact processed filler are superior to resin cutting wheels. Example 1 also demonstrated that the performance characteristic of a carbon bonded cutting wheel can be varied by changing the composition and processing of the abrasive fillers.

EXAMPLE 2

A fourth thin cutting wheel was manufactured to cut a Russian Cemented Carbide BK-8 alloy with 8% Cobalt, a Rockwell hardness of 87.5 and a density of 14.6 gm/cm$^3$. Wheel four had the following abrasive mix:

Wheel Four

45% Superabrasive: synthetic diamond powder, type CDA, with grain size 230/270 mesh.

30% Filler: CBN powder with grain size 3/0 microns.

25% Filler: synthetic diamond powder, type CDA, with grain size 230/270 mesh, impact processed at 20 GPa.

Another experienced machinist used wheel four and two United States made resin bond wheels to slit Russian Cemented Carbide, BK-8 alloy. The Carbide had a profile of

TABLE 4

Results of Sintered Diamond PDC Element Test.

| Wheel | Diameter[1] | Thick[1] | Wheel Volume Removed | Work-piece Volume Removed | G Ratio[2] | Relative Ratio[3] |
|---|---|---|---|---|---|---|
| Bond Resin | 5.967 | 0.035 | .0085 | $3.88 \times 10^{-5}$ | 0.0045 | 1.0 |
| Wheel Two | 4.565 | 0.035 | .0036 | $4.152 \times 10^{-5}$ | 0.0115 | 2.5 |
| Wheel Three | 4.592 | 0.028 | .0072 | $4.152 \times 10^{-5}$ | 0.0057 | 1.3 |

Under these extreme conditions, the resin wheel's G ratio was only 0.0045. Again, as described in note 3 above, the Relative Ratio of the resin wheel was 1. Because wheel one 0.24×0.71×3.15 inches. The two resin bond wheels were high quality products made for such application.

The machinist had a Russian manufactured intensively water cooled saw with a rotational speed of about 4300 RPM. The machinist set a mechanically controlled radial pressure of 10 Newtons on the saw and dressed the wheels according to the manufacturer's recommendations. After each wheel made a cut, the volume of the material removed from the work-piece and the volume of the material removed from the cutting wheel was measured and recorded. The results are shown in Table 5 below.

TABLE 5

Results of Russian Cemented Carbide BK-8 Alloy Test.

| Wheel | Diameter[4] | Thick[4] | Wheel Volume Removed | Work-piece Volume Removed | G Ratio[2] | Relative Ratio[5] |
|---|---|---|---|---|---|---|
| Norton Type 1A1R | 6.01 | 0.04 | 0.00511 | 0.2154 | 42.1 | 3.4 |
| ITI Resin Bond | 4.51 | 0.03 | 0.00815 | 0.10108 | 12.4 | 1.0 |
| Wheel 4 | 4.6 | 0.03 | 0.00444 | 0.55774 | 125.6 | 10.1 |

Note 4
All dimensions in inches.
Note 5
Relative ratio is equal to the G ratio for each wheel divided by the G ratio for the ITI resin wheel.

Of the three wheels shown in Table 5, the ITI resin bond wheel had the lowest G ratio of only 12.4. Therefore, as described in note 5 above, the ITI resin bond wheel was assigned a relative ratio of 1. The Norton Type 1A1R (ASD120-R100B99-9/32) wheel had a G ratio of 42.1 and a relative ratio of 3.4. However, the Norton wheel developed three radial cracks on the working surface down to the metal base. Wheel four's G ratio was 125.6 with a relative ratio of 10.1.

Further experimentation should produce carbon bonded cutting wheels with even better performance. The diamond powder in wheels one to four above was not coated with any metallic compound. The industry uses metallic coatings to extend the service life of abrasive tools. The American manufactured resin bond cutting wheels used in Experiment 1 and 2 had such metallic coating. Wheels one to four above also used Russian synthetic diamond powder which is considered inferior to the synthetic diamond powder used in the resin cutting wheels of American manufacture.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method of producing a carbon bonded abrasive tool, comprising:

(a) selecting a mixture comprising abrasive particles;

(b) shaping the abrasive mixture to form a tool; and (c) saturating the shaped tool with carbon source gas to provide a thin carbon deposit on the individual abrasive particles, thus bonding the abrasive particles together.

2. The method of claim 1, wherein said mixture of abrasive particles comprises a mixture of superabrasive particles and abrasive filler having a random mix of different size filler particles, the filler particles being the same size or smaller than the size of the superabrasive particles and wherein the superabrasive particles and the mixed size abrasive filler are mixed to produce the abrasive mixture.

3. The method of claim 2, wherein the said abrasive filler comprises abrasive particles wherein the individual particles have an original size the same or smaller than the size of the superabrasive particles and wherein said abrasive filler is impact processed by subjecting the abrasive filler to a substantially uniform super-pressure to break up the filler particles into random size filler particles, with some filler particles of the original size interspersed with a continuum of smaller filler particles, thereby producing a mixed size abrasive filler.

4. The method of claim 3, wherein said substantially uniform super-pressure exceeds one gigapascal.

5. The method of claim 2, wherein:

the abrasive filler has abrasive particles with a size the same or smaller than the size of the superabrasive particles, with increasing volumes of decreasing smaller abrasive filler particles, to produce a mixed size abrasive filler.

6. The method of claim 1, wherein step (a) further comprises impact processing all or a portion of the abrasive mixture, by subjecting the abrasive mixture to a uniform super-pressure to break up the abrasive particles into random size particles, with some abrasive particles at the original mesh size interspersed with a continuum of smaller abrasive particles, before shaping the abrasive mixture to form a tool.

7. The method of claim 6, wherein said uniform super-pressure exceeds one gigapascal.

8. A method of producing a carbon bonded abrasive tool comprising:

(a) selecting a mixture of abrasive particles and mixed size abrasive filler particles said filler particles being the same size or smaller than the size of the abrasive particles;

(b) adding a plasticizer to the abrasive mixture to form a plasticizer mixture;

(c) forming the plasticizer mixture to a shaped plasticized green form;

(d) carbonizing the plasticizer to produce a porous shaped tool; and (e) saturating the shaped tool with carbon source gas to provide a thin carbon deposit on the individual abrasive particles, thus bonding the abrasive particles together.

9. The method of claim 8, wherein the plasticizer is a phenol-formaldehyde resin in a solvent.

10. The method of claim 8, wherein the plasticizer is selected from the group comprising clay, kaolin, montmorillonite, and a cementatious material.

11. The method of claim 1, wherein the preshaped tool is saturated with a carbon source gas in a reaction vessel at a temperature of optimally 1170 K to 1200 K and with a relatively low gas pressure.

12. The method of claim 1, wherein the carbon deposit is pyrolytic carbon.

13. The method of claim 1, wherein the carbon deposit is a mixture of carbon black and pyrolytic carbon.

14. The method of claim 1, wherein the carbon deposit is a low temperature pyrolytic carbon, formed at 670 K to 1370 K.

15. The method of claim 1, wherein the carbon deposit is a high temperature pyrolytic carbon, formed at 1370 K to 2460 K.

16. The method of claim 1, wherein the carbon deposit is formed at a minimum pressure and temperature where only pyrolytic carbon will be deposited.

17. The method of claim 1, wherein the carbon source gas is diluted with an inert gas such as nitrogen.

18. The method of claim 1, wherein the carbon source gas is at a pressure below 1000 Pascal.

19. The method of claim 1, wherein the carbon deposits at temperatures not exceeding 1770 K.

20. The method of claim 1, wherein the carbon source gas is mixed with hydrogen to reduce the rate of condensation to more completely permeate the shaped tool.

21. The method of claim 1, wherein the carbon deposit is diamond.

22. The method of claim 1, wherein the carbon deposit is a polymorphous diamond.

23. The method of claim 1, wherein the carbon deposit comprises a combination of at least two of diamond, a polymorphous diamond, pyrolytic carbon.

* * * * *